United States Patent [19]

Balling et al.

[11] Patent Number: 6,075,944
[45] Date of Patent: Jun. 13, 2000

[54] FLASH CAMERA WITH OPAQUE LENS BAFFLE PROTRUDING FROM FRONT TRANSLUCENT OUTER COVER TO PREVENT OUTER COVER FROM TRANSMITTING FLASH ILLUMINATION TO TAKING LENS

[75] Inventors: Edward N. Balling, Rochester; James G. Rydelek, Henrietta; Kevin J. O'Leary, Rochester, all of N.Y.

[73] Assignee: Eastman Kodak Company, Rochester, N.Y.

[21] Appl. No.: 09/272,459

[22] Filed: Mar. 19, 1999

[51] Int. Cl.[7] .................................................... G03B 17/24
[52] U.S. Cl. ................... 396/6; 396/29; 396/535
[58] Field of Search .................................. 396/25, 28, 29, 396/27, 6, 535

[56] References Cited

U.S. PATENT DOCUMENTS

| | | |
|---|---|---|
| 4,052,728 | 10/1977 | Hendry et al. . |
| 5,233,379 | 8/1993 | Burnham . |
| 5,381,200 | 1/1995 | Takagai . |
| 5,400,098 | 3/1995 | Rydelek . |
| 5,692,221 | 11/1997 | Tobioka et al. . |
| 5,697,005 | 12/1997 | Kikuchi . |
| 5,708,858 | 1/1998 | Reibl .......................................... 396/25 |
| 5,710,946 | 1/1998 | Rydelek et al. . |

*Primary Examiner*—David M. Gray
*Attorney, Agent, or Firm*—Roger A. Fields

[57] ABSTRACT

A one-time-use camera comprises an opaque main body part; a flash device on the main body part that provides flash illumination; a taking lens on the main body part; a light-transmitting outer cover having an opening for the flash device and an opening for the taking lens; and an opaque inner cover part, behind the light-transmitting outer cover, having an opening for the flash device that is aligned with the opening for the flash device in the light-transmitting outer cover, and including an opaque lens baffle for the taking lens that projects from the opaque inner cover part, through the opening for the taking lens in the light-transmitting outer cover, and protrudes from the light-transmitting outer cover to prevent the light-transmitting outer cover from transmitting flash illumination to the taking lens.

3 Claims, 2 Drawing Sheets

FLASH CAMERA WITH OPAQUE LENS BAFFLE PROTRUDING FROM FRONT TRANSLUCENT OUTER COVER TO PREVENT OUTER COVER FROM TRANSMITTING FLASH ILLUMINATION TO TAKING LENS

FIELD OF THE INVENTION

The invention relates generally to the field of photography, and in particular to flash cameras. More specifically, the invention relates to a flash camera with an opaque lens baffle that protrudes from a light-transmitting outer cover to prevent the outer cover from transmitting flash illumination to the taking lens.

BACKGROUND OF THE INVENTION

Prior art U.S. Pat. No. 5,710,946 issued Jan. 20, 1998 discloses a water-resistant one-time-use camera in which the camera is encased in a transparent water-resistant outer casing. The camera comprises an opaque main body part and a pair of opaque front and rear cover parts that connect to one another to contain the main body part between them. The opaque front cover part has a lens opening for a taking lens on the main body part. The transparent outer casing consists of outer front and rear covers that connect to one another over the opaque front and rear cover parts.

PROBLEM

If the camera included a typical flash device, flash illumination might be transmitted along the transparent front outer cover to the taking lens. This can cause several problems, such as overexposure of the pictures and a halo effect on each picture which is due to edge illumination of the taking lens.

SUMMARY OF THE INVENTION

Generally, a camera comprises:
a flash device that provides flash illumination;
a taking lens;
a light-transmitting outer cover having an opening for the taking lens; and
an opaque lens baffle for the taking lens that protrudes from the opening in the light-transmitting outer cover to prevent said light-transmitting outer cover from transmitting flash illumination to said taking lens.

More specifically, the camera comprises:
an opaque main body part;
a flash device on the main body part that provides flash illumination;
a taking lens on the main body part;
a light-transmitting outer cover having an opening for the flash device and an opening for the taking lens; and
an opaque inner cover part, behind the light-transmitting outer cover, having an opening for the flash device that is aligned with the opening for the flash device in the light-transmitting outer cover, and including an opaque lens baffle for the taking lens that projects from the opaque inner cover part, through the opening for the taking lens in the light-transmitting outer cover, and protrudes from the light-transmitting outer cover to prevent the light-transmitting outer cover from transmitting flash illumination to the taking lens.

DETAILED DESCRIPTION OF THE INVENTION

The invention is disclosed as being embodied preferably in a water-resistant one-time-use camera. Because the features of a water-resistant one-time use camera are generally known, the description which follows is directed in particular only to those elements forming part of or cooperating directly with the disclosed embodiment. It is to be understood, however, that other elements may take various forms known to a person of ordinary skill in the art.

Figure 1:
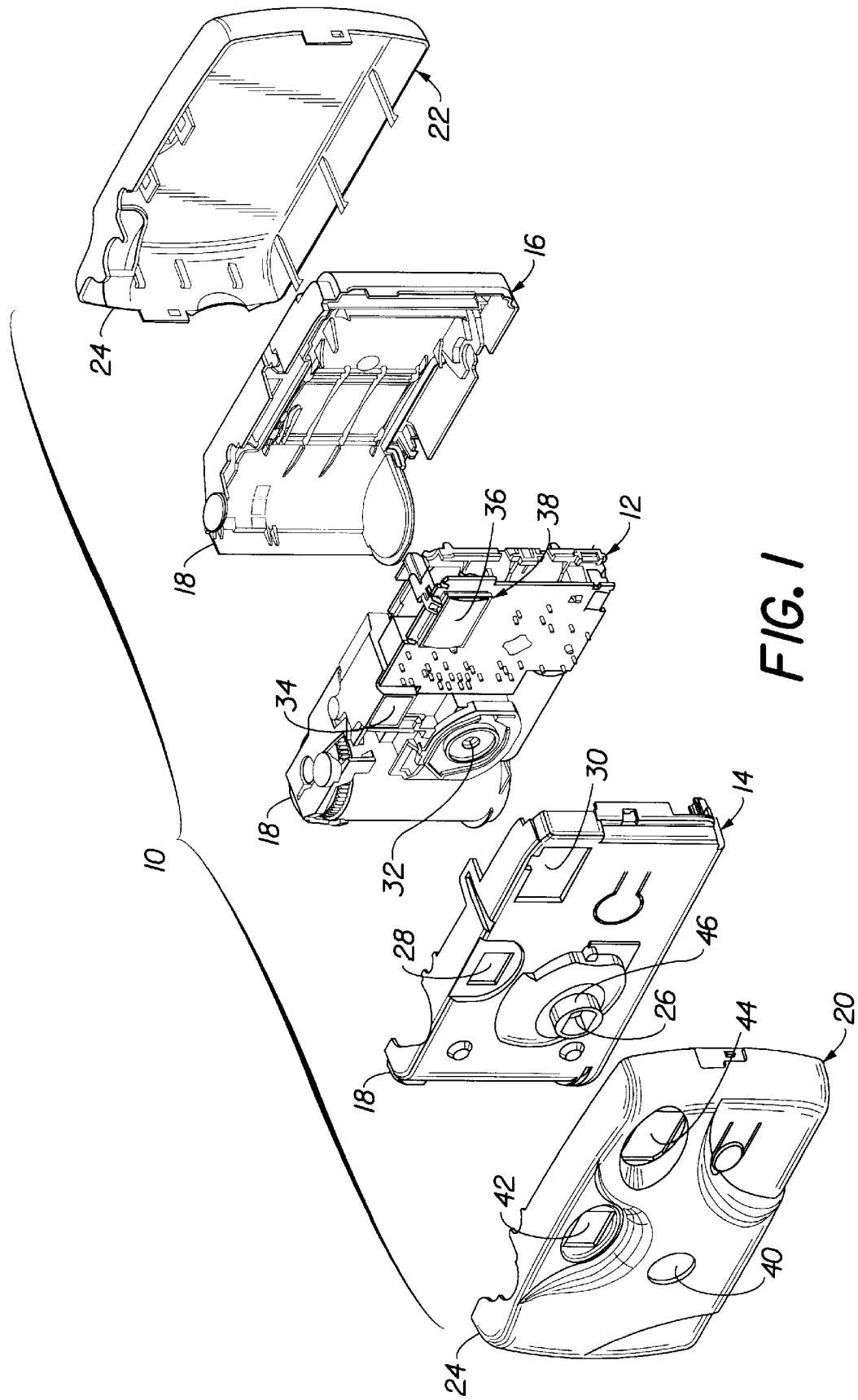
FIG. 1 is an exploded perspective view of a one-time-use camera according to a preferred embodiment of the invention.
Figure 2:
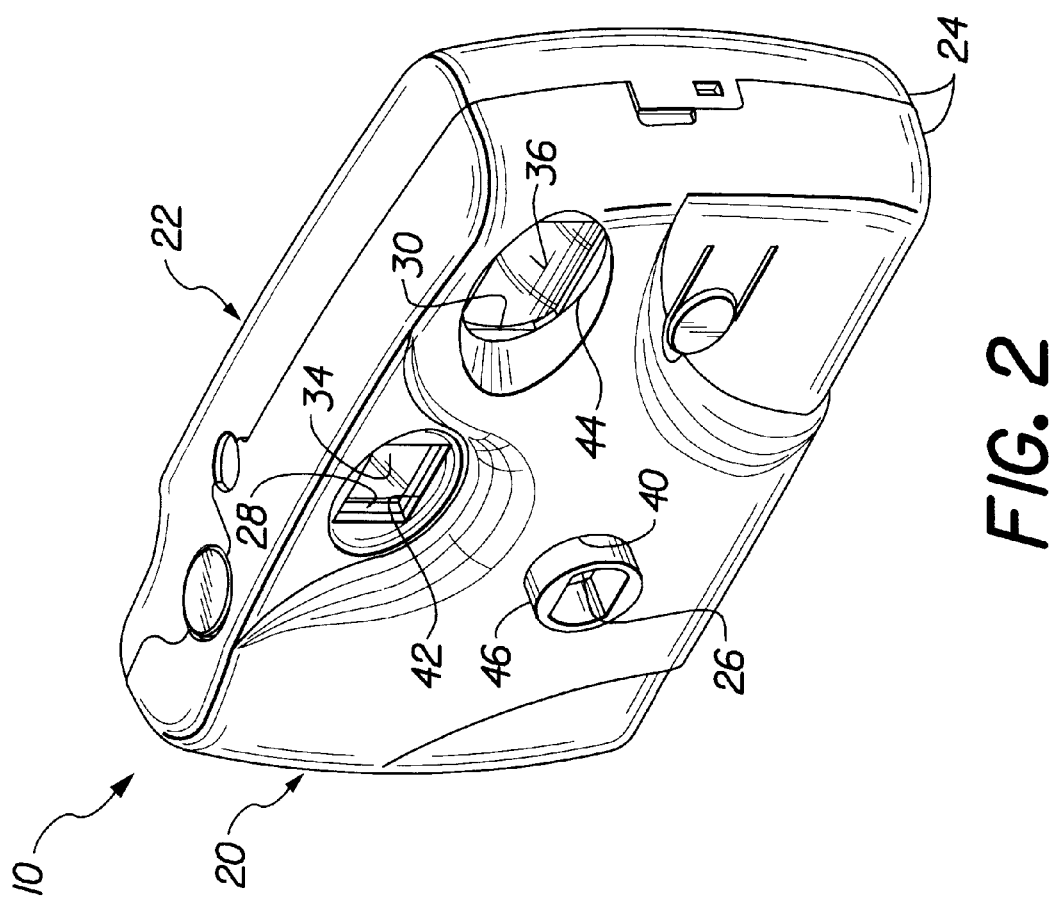
FIG. 2 is an assembled view of the camera.

Referring now to the drawings, FIGS. 1 and 2 show a water-resistant one-time-use camera 10 in which an opaque main body part 12 is contained in a pair of opaque front and rear inner cover parts 14 and 16 that connect to one another and to the main body part. The main body part 12 and the front and rear inner cover parts 14 and 16 are a camera or picture-taking unit 18. A pair of light-transmitting, i.e. transparent or translucent, front and rear outer covers 20 and 22 connect to one another to house the camera unit 18 between them, in order to complete the water-resistant camera 10. The front and rear outer covers 20 and 22 form a water-resistant casing 24 for the camera unit 18.

The front inner cover part 14 has respective openings 26, 28 and 30 for a taking lens 32 on the main body part 12, a front viewfinder lens 34 on the main body part, and a flash emission lens 36 for an electronic flash device 38 on the main body part.

The front outer cover 20 has respective openings 40, 42 and 44 that are aligned with the openings 26, 28 and 30 in the front inner cover part 14.

An opaque lens baffle 46 for the taking lens 32 is integrally molded with the front inner cover part 14. The lens baffle 46 projects outwardly from the front inner cover part 14, around the opening 26 in the front inner cover part, and outwardly through the opening 40 in the front outer cover 20. As shown in FIG. 2, the lens baffle 46 protrudes from the opening 40 in the front outer cover 20. This is done to prevent the front outer cover 20 from transmitting flash illumination (provided at the flash device 38) to the taking lens 32.

A method of assembling the water-resistant camera 10 comprises the steps:

placing the opaque front inner 14 cover part over the main body part 12, with the respective openings 30 and 26 in the front inner cover part being positioned at the flash device 38 and the taking lens 32 on the main body part;

placing the light-transmitting front outer cover 20 over the opaque front inner cover part 14, with the opening 44 in the front outer cover being positioned at the opening 30 for the flash device 38 in the front inner cover part and the opaque lens baffle 46 projecting from the front inner cover part, through the opening 40 for the taking lens 32 in the front outer cover, and protruding from the front outer cover to prevent the front outer cover from transmitting flash illumination to the taking lens; and placing the light-transmitting rear cover 22 over the opaque rear cover part 24.

The invention has been described with reference to a preferred embodiment. However, it will be appreciated that variations and modifications can be effected by a person of ordinary skill in the art without departing from the scope of the invention.

PARTS LIST 10. water-resistant one-time-use camera
12. opaque main body part 14. opaque front inner cover part
16. opaque rear inner cover part
18. camera unit
20. light-transmitting front outer cover
22. light-transmitting rear outer cover
24. water-resistant casing
26. opening
28. opening
30. opening
32. taking lens
34. front viewfinder lens
36. flash emission lens
38. electronic flash device
40. opening
42. opening
44. opening
46. opaque lens baffle

What is claimed is:

1. A camera comprising:

an opaque main body part;

a flash device on said main body part that provides flash illumination;

a taking lens on said main body part;

a light-transmitting outer cover having an opening for said flash device and an opening for said taking lens; and an opaque inner cover part, behind said light-transmitting outer cover, having an opening for said flash device that is aligned with said opening for said flash device in said light-transmitting outer cover, and including an opaque lens baffle for said taking lens that projects from said opaque inner cover part, through said opening for said taking lens in said light-transmitting outer cover, and protrudes from said light-transmitting outer cover to prevent said light-transmitting outer cover from transmitting flash illumination to said taking lens.

2. A camera as recited in claim 1, wherein said light-transmitting outer cover is transparent.

3. A camera as recited in claim 1, wherein said light-transmitting outer cover is translucent.

* * * * *